June 7, 1932.  P. B. REEVES  1,862,198

DRIVING BELT

Filed Nov. 16, 1931

INVENTOR.
Paul B. Reeves,
BY
Hood & Hahn.
ATTORNEYS

Patented June 7, 1932

1,862,198

UNITED STATES PATENT OFFICE

PAUL B. REEVES, OF COLUMBUS, INDIANA, ASSIGNOR TO REEVES PULLEY COMPANY, OF COLUMBUS, INDIANA, A CORPORATION OF INDIANA

DRIVING BELT

Application filed November 16, 1931. Serial No. 575,265.

My invention relate to improvements in edge-drive belts which, without sacrificing longitudinal strength or lateral flexibility, will have a higher power transmission capacity than has heretofore been found possible with belts of this type.

My invention relates particularly to that type of belt which is formed of a flexible band reinforced transversely by cross blocks the opposite ends of which have inclined friction faces. In such a belt the transverse blocks are necessarily spaced from each other lengthwise of the belt and, at high speeds such a belt chatters on the friction cones with which it is used. My improved belt eliminates this tendency to chatter.

The accompanying drawing illustrates an embodiment of my invention.

My belt comprises a main body 1 which, lengthwise, must be capable of transmitting the maximum tensional force to which the belt is to be subjected, and which must be sufficiently laterally flexible to permit practically indefinite repeated transverse flexures without the expenditure of too much power. In general this element 1 is most conveniently formed of standard rubber belting which is, as is well known, a longitudinally strong, laterally readily flexible, cotton webbing impregnated and coated with rubber. I shall therefore hereafter refer to this element 1 as a web, although it should be understood that it may be of a non-web like material so long as it possesses the necessary qualities of longitudinal strength and lateral flexibility.

Figure 1:
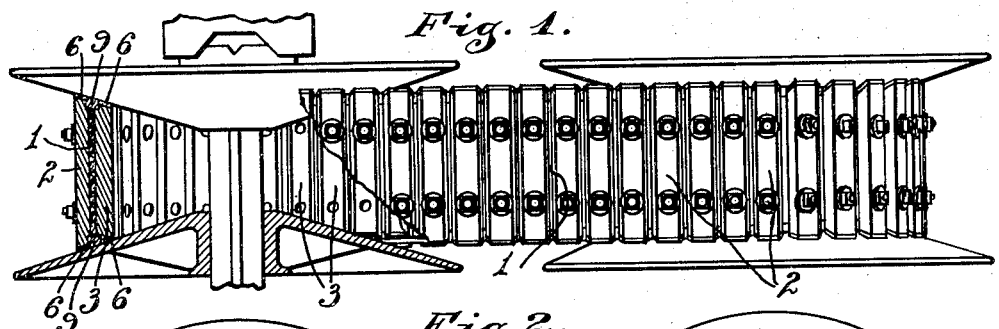
Fig. 1 is a partial plan view, partially in horizontal section, of my improved belt and cooperative portions of a speed-varying transmission of well-known form.
Figure 2:
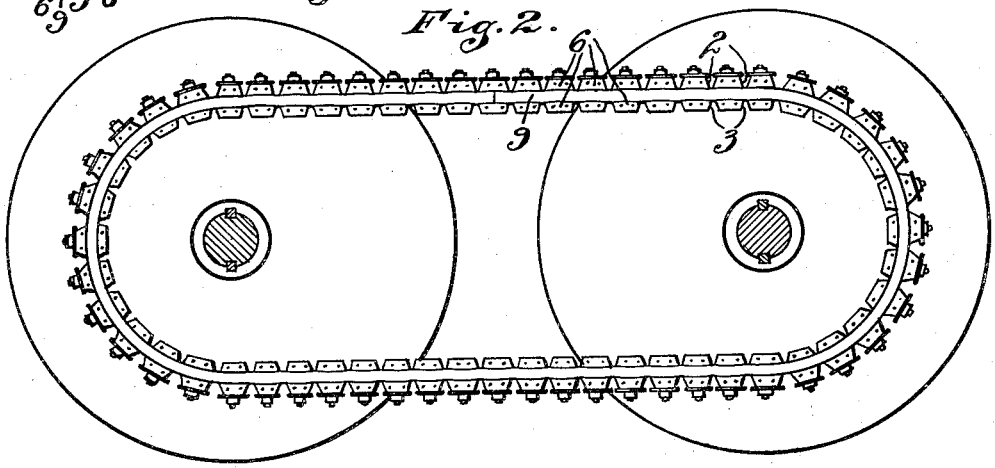
Fig. 2 is a side elevation, in partial section, of the parts shown in Fig. 1.
Figure 6:
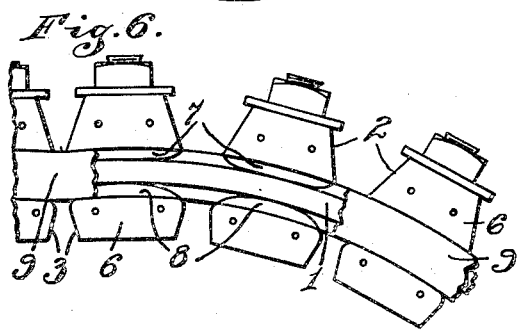
Fig. 6 is a fragmentary side elevation with parts broken away.
Figure 4:
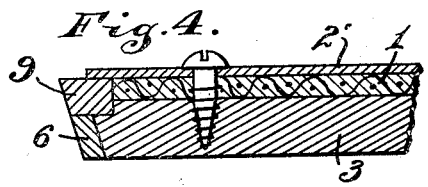
Fig. 4 is a similar section of another form.

Such a web, when wide enough to transmit desired forces is not sufficiently rigid transversely to receive desired forces edgewise and it has heretofore been customary to transversely reinforce such webs by cross blocks 2 and 3, (as in Fig. 3), where the ends 5 of the blocks are inclined and provided with friction faces 6, or with transverse blocks 3 having friction faces 6 and reinforcing plates 2', as in Fig. 4. In such a belt forces are transmitted to and from the web 1 through the friction ends of the transverse blocks and, as previously stated, such a belt has a tendency to chatter at high speeds. The maximum power transmitting value of such a belt, would be determined by the area of the friction ends of the stiffening blocks because, in practice, the web 1 does not have a width sufficient to bring its edges into frictional play. In case the web is of sufficient width to bring its edges into frictional play, the power transmitting capacity of the belt would be slightly increased, perhaps, but between adjacent blocks, the power transmitting value would be practically negligible because of the necessary thinness of the web. Further than this, rubber webbing, such as is most practically useful in belts of this type, does not serve effectively to receive or transmit forces through the edges. Heretofore the most common form of belts of this type in commercial use have embodied both an outer and an inner series of friction end blocks carried by the central web and the central web has been narrow enough to avoid frictional contact with the friction cones.

In order to gain additional frictional surface, without materially decreasing lateral flexibility of the belt, I chamfer the adjacent corners of the blocks 2 and 3 to form seats 7 and 8 immediately adjacent the edges of web 1, and in these chamfers I seat a continuous strip 9 of friction material 9 which, conveniently, may be half of any ordinary well-known V-belt, the lateral dimension of which, i. e., the dimension parallel with the width of web 1, may be comparatively small and the radial dimension of which may be as desired within the limits of ready lateral flexibility of the material. The outer face of each strip 9, in the form of belt shown in Fig. 3 is beveled so as to lie in the plane of the friction ends of the transverse blocks 2 and 3 and in the form shown in Fig. 4 the outer face of each strip 9 is similarly beveled and lies in the plane of the adjacent friction ends of the blocks 3.

Figure 5:
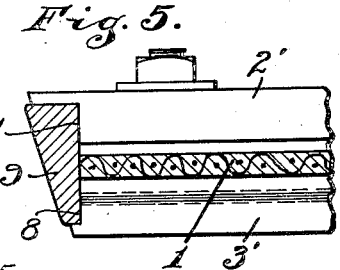
Fig. 5 is a similar section of a third form.
Figure 3:
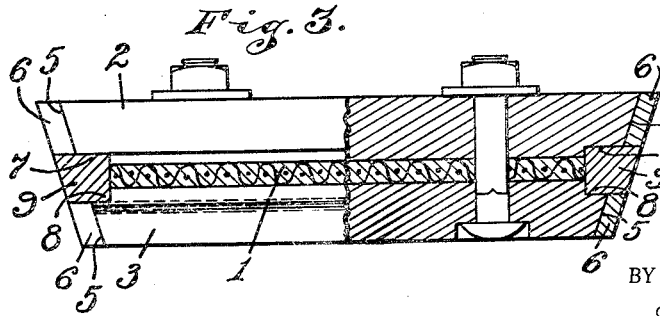
Fig. 3 is a transverse section, on a scale larger than the scales of Figs. 1 and 2, of one form of my improved belt.

In the form shown in Fig. 5, which probably is not quite as efficient as the form shown in Fig. 3, the web 1 is transversely stiffened by the cross blocks 2' and 3', the inner corner of each of which is chamfered to form the seats 7 and 8, and in these seats is secured the friction strip 9, the outer face of which is properly beveled to frictionally engage friction cones of the transmission mechanism. In this form the radial dimension of each strip 9 is relatively somewhat greater than in the other forms and the ends of the transverse blocks 2' and 3' are not provided with friction material, the entire transmission of force being to and through the outer faces of the strips 9, 9. The flexibility of a belt of the type shown in Fig. 5 is within the range of practicability because the necessary longitudinal strength is furnished by the web 1 and the lateral flexibility of the elements 9, 9 is due to the relative narrowness of the elements in the plane of the web 1.

I claim as my invention.

1. An edge drive belt comprising a relatively thin main web, spaced transverse blocks secured to said web, and two strips of friction material secured to the opposite ends of the transverse blocks and bridging therebetween, said friction strips having a relatively small dimension in the plane of the web and a dimension transversely of the web substantially greater than the thickness of the web.

2. An edge drive belt comprising a relatively thin main web, spaced transverse blocks secured to said web and having inclined friction ends, and two strips of friction material secured to the opposite ends of the transverse blocks and bridging therebetween, said friction strips having a relatively small dimension in the plane of the web and a dimension transversely of the web substantially greater than the thickness of the web, each of said strips having an inclined outer face in the plane of the adjacent friction ends of the blocks.

In witness whereof, I, PAUL B. REEVES, have hereunto set my hand at Columbus, Indiana, this 4th day of Nov., A. D. one thousand nine hundred and thirty one.

PAUL B. REEVES.